May 27, 1941.  W. KELLEY  2,243,314

POURING RING FOR SEALING PIPES

Filed Jan. 22, 1940

INVENTOR.
Walter Kelley
BY
ATTORNEY.

Patented May 27, 1941

2,243,314

UNITED STATES PATENT OFFICE 2,243,314

POURING RING FOR SEALING PIPES

Walter Kelley, Van Nuys, Calif.

Application January 22, 1940, Serial No. 314,935

4 Claims. (Cl. 25—127)

The primary object of my invention is the provision of a means for effectively and economically sealing the joints of pipe sections in the process of laying the same.

An essential object is the provision of a device obviating the usual requirement of stuffing a stoppage material into the joint preparatory to the introduction of the sealing material, together with the common practice of forcing said material in place by driving the same with a chisel and whereby cracked and broken pipe is quite often a result.

A further object of my invention is to provide a device of said character for effectively introducing the sealing material into the annular space formed within the pipe bell upon insertion of the spigot end of the connecting pipe length; readily connected thereto, and assuring a smooth, clean joint seal.

A further object is the provision of a device which may readily be produced in varying sizes; conserve the sealing material so as to eliminate waste, yet effectively assure a solid and durable seal against inward and outward line stresses, free from irregularities and hollow spaces bound to result upon deterioration and the breaking away when the customary filler material such as oakum, clay, mud and paper is used as a stuffing material.

And a further object of my invention is the provision of a device adaptable to any of the common liquid or semi-liquid sealing materials, such as cement, sulphur, lead, asphaltum, and the like.

I attain these objects by the device illustrated in the drawing, in which.

Similar numerals and letters of reference indicate like parts thruout the several views.

Figure 1:
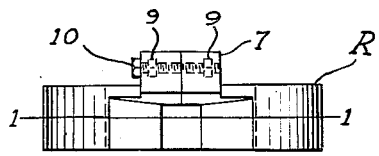
Figure 1 is a top or plan view of the invention.
Figure 2:
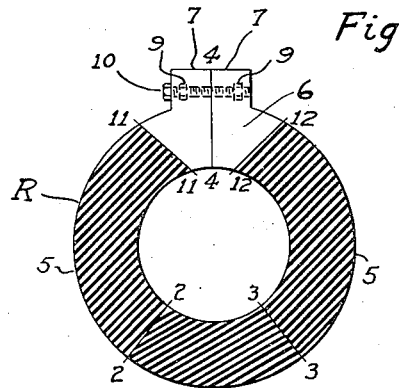
Figure 2 is a section taken on the line 1—1 of Figure 1.
Figure 3:
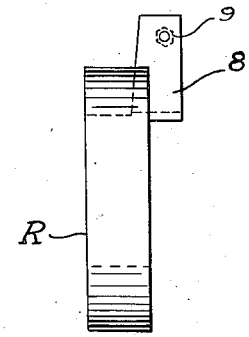
Figure 3 is a side elevation thereof.
Figure 4:
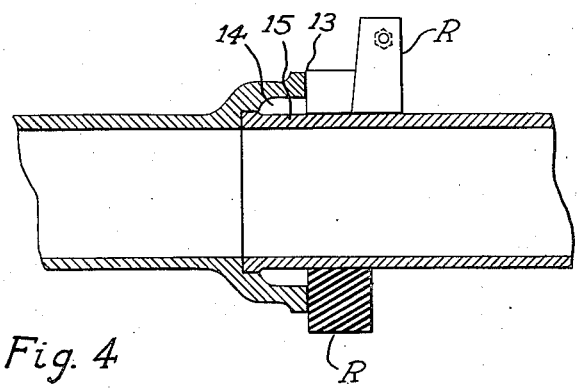
Figure 4 is a sectional view taken along the center line of the joint formed by the ends of separate pipe sections connected to one another, and showing my pouring ring for sealing pipes in place.

Thus, R indicates the invention proper which may be constructed of any suitable material preferably impervious to water, and heat, such as rubber and the several compositions thereof, for example, and comprises three undivided sections, one inherently flexible, the others inherently non-flexible as may be provided by different curing operations. The flexible section 1 is located at the extreme lower radius of the periphery of the device for a space equi-distant from the center thereof and within the confines of the lines 2—2 and 3—3, the non-flexible sections 5 extending on either side thereof to complete the device, and having their respective ends terminating in beveled cut-away portions 6 and offset ears or lugs 7 which comprise separate interconnectible end members similar to a split ring as is indicated by the line 4—4, each of said lugs 7 having a protuberance or boss 8 outwardly extending therefrom to compensate for the reduced width of the lugs by reason of the cut-away portion, and in each of which there is embedded a threaded nut 9 for engagement with a threaded bolt 10.

Said cut-away portion 6 is substantially wedge-shaped and extends through the periphery of the device as is indicated by lines 11—11 and 12—12 so as to form an opening for the introduction of the sealing material to the pipe joint it is intended to seal. Each of the lugs embraces a one-half portion of said wedge-shaped opening, so that when the respective lugs are interconnected, there is formed the complete opening as aforementioned for the introduction of the sealing material; said wedge-shaped opening forming an inlet or runway through which the material passes into the pipe joint. In other words, the free ends of the ring are formed to provide the circumferentially spaced beveled end portions 6 and the abutting end portions 7 which latter are extended circumferentially beyond the beveled end portions and lie to one side of the center thereof so that they may abut and form a sealing wall or dam when the sealing material is poured or forced through the opening between said beveled ends. These portions 7 are enlarged laterally and radially to form the lugs 8 which extend beyond the outer periphery and one side face of the ring respectively.

In practice, the bolt 10 is unscrewed until free of contact with the farthermost nut 9. This releases the respectively secured ends from one another so that they may be outwardly extended or expanded to encircle the pipe joint at its spigot end to be sealed. The flexible section 1 readily makes possible such extension or expansion in as much as it functions in hinge like manner. Thus positioned, the device is moved immediately adjacent the edge of the connecting pipe bell end as at 13, after which the bolt 10 is screwed back into the free end nut so as to interconnect the respective lugs with each other and whereby the device is simultaneously clamped to the pipe section ready for the joint sealing operation.

The sealing material is introduced as aforesaid through the wedge-shaped portion or inlet 6 and is free to run therethrough until it fills up the entire open area 14 of the pipe bell. It can extend no further as the connecting spigot end section 15 closes the opening by forming a bottom which thus prevents the sealing material from flowing beyond the same.

Whatever the nature of the sealing material, it is bound to fully fill in said open pipe bell area, evenly distributed therein, leaving no gaps, crevices, etc., to entrap foreign matter and clog up the pipe line, a more or less common occurrence with the usual pipe sealing method in vogue.

Moreover, since the device is immovably affixed during the sealing operation immediately adjacent the pipe bell edge, the seal is accomplished without the usual waste by its positive confinement within the area the pipe bell alone provides. Pouring of the material may thus be regulated and discontinued once it is indicated that the bell will retain no more, after which the seal may be left to harden, and the device removed by simply reversing the method of its attachment. It is then available for the making of additional jointing operations.

Presenting a smoothly finished pipe joint, tree roots and plant growth are positively prevented from extending themselves therein, and constant re-use of the device will show no extensive wear.

Readily produced from materials obtained in the open market and at no great cost, the device should prove of immediate benefit to all employed in the pipe laying trade, the plumbing trade especially should find it extremely well adapted to its immediate need.

I am aware that slight modifications may from time to time be made in the details of structure illustrated without departing, however, from the scope of the present invention, and as defined in the claims which are appended hereto. Hence, I do not limit my present invention to the exact description of construction herein disclosed, but what I do claim is:

1. In a pouring ring for sealing pipes, a split ring including a plurality of joined sections of which one is inherently flexible to serve as a hinge permitting of separation of the ends of the ring, and the other sections are inherently non-flexible, portions of the opposed faces of said ends being circumferentially spaced apart to form a pouring opening and the remainder of said end faces being disposed to abut one another to form a wall for one side of said pouring opening.

2. The structure as set forth in claim 1 wherein the abutting end portions of the ring are extended laterally from the side and radially from the outer periphery of the ring, and means for detachably securing said abutting portions in abutting relation to one another.

3. In a pouring ring for sealing pipes, a split ring having portions of its free ends adapted to abut and other portions of said ends disposed in circumferentially spaced relation to form a pouring opening closed on one side by said abutting portions, and means for releasably holding said abutting portions in abutting relation.

4. The structure as set forth in claim 3 in which the abutting portions are extended radially outwardly from the outer periphery of the ring and laterally from one side of the ring.

WALTER KELLEY.